United States Patent Office

2,802,844
Patented Aug. 13, 1957

2,802,844

PROCESS OF RECOVERING RICE BRAN WAX

Reuben O. Feuge and Edwin R. Cousins, New Orleans, La., assignors to the United States of America as represented by the Secretary of Agriculture No Drawing. Application July 21, 1953,
Serial No. 371,746

3 Claims. (Cl. 260—412.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of wax. More particularly, the invention provides a process of producing hard wax from the tank settlings from crude rice bran oil.

Waxes are complex mixtures classified as waxes on the basis of physical properties as well as chemical properties. Crude rice bran oil, as presently extracted, generally contains about 1 or 2% wax. In processing of the oil, the high melting fraction of the wax, which is quite insoluble in the oil, settles out in a voluminous oil-rich sludge which, heretofore, was discarded as having substantially no commercial value.

A primary object of this invention is the provision of a commercially feasible process of producing a hard wax from the tank settlings from crude rice bran oil which approaches carnauba wax in physical properties.

In general, this invention provides a process of producing a hard wax from a crude rice bran oil tank settling, which comprises, isolating from the settling a mixture consisting essentially of settling components which are soluble in isopropyl alcohol at temperatures above 26° C. and which are insoluble in isopropyl alcohol at temperatures below 26° C.

We have discovered that mixtures consisting essentially of the components of such settlings having the indicated solubility in isopropyl alcohol, constitute hard, non-tacky waxes having comparable properties whether the settlings were washed free of acetone soluble components and hydrolyzed or saponified, or whether the settlings were hydrated, or whether the settlings were fractionally crystallized from non-polar solvents such as ether, prior to a fractional crystallization from isopropyl alcohol to isolate the indicated fraction of settling components.

Tank settlings domestically available, which are generally from crude oil extracted with commercial hexane, vary in composition and quality, as might be expected. Those from crude oil extracted from bran of good quality are usually tan to brown in color and possess the rather pleasant odor characteristic of crude rice bran oil. Their consistency varies from that of soft butter to that of a heavy, viscous liquid.

The solid and liquid portions of tank settlings cannot readily be separated by filtration. Any filter fine enough to retain the solids clogs almost immediately on use. The addition of hexane to settlings permits their filtration at a more rapid but still unsatisfactory rate. The addition of acetone to settlings produces a mixture which does filter readily. Furthermore, the wax is only slightly soluble in the latter solvent (J. Am. Oil Chemists' Soc. 25 206–211, 1948). Isopropanol behaves somewhat like acetone as a solvent for settlings.

Tank settlings consist principally of oil and free fatty acids derived from the oil. The remaining portion contains, in addition to the wax, a sizeable proportion of phosphatides. Usually particles of meal, trash, and calcium carbonate (frequently used in the milling of rice) are present in minor amounts. The settlings also contain some gums, resins, and degraded organic matter.

Impurities such as meal, trash, calcium carbonate, gum, resins, and the like are preferably removed prior to the fractional crystallization from isopropyl alcohol. Impurities can suitably be removed by non-polar solvent extraction and/or hydrolysis, saponification, hydration and the like wax purification treatments.

The fractionation in isopropyl alcohol is preferably conducted by removing impurities insoluble in a relatively small amount of hot isopropyl alcohol (about 3 parts at about 70 to 80° C.) and one or more crystallizations conducted by dissolving the hot isopropyl alcohol soluble components in a relatively large amount of hot isopropyl alcohol (about 6 parts at about 70 to 80° C.) and recovering the crystals which form in the resultant solution at 26° C.

The rice bran wax obtained by isopropyl alcohol fractionation in accordance with this invention can suitably be bleached by the use of hydrogen peroxide or a combination of hydrogen peroxide, chromium trioxide and sulfuric acid. Unobviously, the use of about 10% of activated clay or carbon has little effect on the color of such waxes.

The following examples are illustrative of the invention.

There are no standard methods for analyzing waxes. The methods of the American Oil Chemists' Society (Official and Tentative Methods, 2nd ed., edited by V. C. Mehlenbacher, Chicago, 1946) for analyzing fats and oils are suitable for some analyses involving waxes and were used in the present investigation to determine iodine value, free fatty acids, volatiles, softening point, and saponification value. In the latter determination isopropanol was substituted for the ethanol specified in the standard method.

Content of unsaponifiables was determined by the method of Murray and Schonfeld (J. Am. Oil Chemists' Soc., 28, 461–466, 1951), which they found suitable for carnauba wax.

For the phosphorus determination the sample of wax was washed with the aid of alcoholic magnesium nitrate and was then analyzed according to the method of Pons and Guthrie (Ind. Eng. Chem., Anal. Ed., 18, 184–186, 1946).

All melting points reported were obtained by the drop method (Warth, A. H., The Chemistry and Technology of Waxes, Reinhold Publishing Corporation, New York, 1947, p. 322), which consists essentially of solidifying a film of wax on the bulb of a thermometer, slowly heating the coated bulb in an air bath, and recording the temperature at which the wax melts and collects in a drop at the bottom of the bulb.

Hardness of the waxes was measured at room temperature using the Shore durometer method described by Warth (The Chemistry and Technology of Waxes, Reinhold Publishing Corp., N. Y., 1947, p. 332). On the durometer scale, yellow U. S. P. beeswax has a hardness of about 45 and 90% palmitic acid has a hardness of about 50, both measured at 25° C.

Samples of tank settlings designated as S–1 and S–2 having the properties indicated by the following table were employed in the examples:

TABLE I

|  | Sample S-1 | Sample S-2 |
|---|---|---|
| Iodine value | 77.0 | 71.8 |
| Free fatty acids, as oleic, percent | 21.6 | 6.5 |
| Volatiles, hot plate method, percent | 4.1 | 6.5 |
| Saponification value | 166.7 | 179.8 |
| Unsaponifiable, percent | 14.0 | 10.3 |
| Phosphorus, percent | 0.44 | 1.64 |
| Hexane soluble, percent [a] | 96.4 | 79.4 |

[a] Continuous extraction with hot hexane for 3 hours.

Before each portion of settlings was used, it was melted and filtered through a 60-mesh screen to remove any coarse trash.

Example 1

A portion of tank settling S–1 was subjected to the following treatments:

1. One part of acetone was mixed with one part of tank settlings and the mixture was filtered under vacuum. The mixing with acetone and filtration was repeated twice, using half of the original quantity of acetone each time. The acetone-insoluble or wax fraction then was air-dried for 48 hours.

2. One part of the acetone-insoluble fraction produced by step 1 was hydrolyzed with one part of water at 177° C. for one hour and the hydrolysis product was water washed and air dried.

3. One part of the hydrolyzed fraction produced by step 2 was boiled with 6 parts of isopropyl alcohol and the insoluble materials were removed by filtering the hot mixture.

4. The filtrate from step 3 was cooled to 26° C. and the solids which formed were isolated by filtration. The solids constituted a hard non-tacky wax and amounted to 13.7% by weight of the crude settlings used in step 1.

Example 2

A portion of tank settlings S–1 was subjected to the following treatments:

1. An acetone-insoluble fraction was prepared as in Example 1.

2. One part of the acetone-insoluble fraction produced by step 1 was saponified for 2 hours at 80° C. with 0.15 part sodium hydroxide in the presence of 1.33 parts water and 0.67 part isopropyl alcohol and the saponification product was acidified with 30% sulfuric acid, water washed, and air dried.

3. One part of the saponified fraction produced in step 2 was boiled with 6 parts of isopropyl alcohol and the insoluble materials were removed by filtering the hot mixture.

4. The filtrate from step 3 was cooled to 26° C. and the solids which formed were recovered by filtration.

5. One part of the solids recovered in step 4 was boiled with 6 parts of isopropyl alcohol. The resulting solution was cooled to 26° C. and the solids which formed were isolated by filtration. The solids constituted a hard non-tacky wax and amounted to 12.8% by weight of the crude settlings used in step 1.

Example 3

A portion of tank settlings S–1 was subjected to the following treatments:

1. One part of the settlings was mixed with 0.05 part of water and agitated for 5 minutes for 71° C., settled and decanted.

2. One part of the de-gummed settlings produced by step 1 was mixed with one part of acetone and the insoluble materials were recovered by filtration. The recovered solids were mixed with 0.5 part acetone and insolubles were recovered by filtration. The recovered solids were mixed with 0.5 part of acetone and the insolubles were recovered by filtration and air dried.

3. One part of the acetone washed phosphatide-free settlings produced by step 2 was boiled with 3 parts of isopropyl alcohol and the insoluble materials were removed by settling and decanting the hot mixture.

4. The filtrate from step 3 was cooled to 26° C., maintained at that temperature for 1 hour, and the solids which formed were recovered by filtration. The solids so removed constituted a hard non-tacky wax and amounted to 8.3% by weight of the crude settlings used in step 1.

Example 4

A portion of tank settlings S–1 was subjected to the following treatments:

1. One part of the settlings was boiled with one part of ether, cooled, centrifuged, and the recovered solid fraction was boiled with 0.7 part ether, cooled, centrifuged and desolventized by stripping under vacuum.

2. One part of the ether-insoluble fractions produced by step 1 was boiled with 3 parts of isopropyl alcohol and the resulting solution was cooled to 26° C. and filtered.

3. One part of the solids recovered from isopropyl alcohol in step 2 was boiled with 6 parts of isopropyl alcohol and insolubles were removed by filtration from the hot mixture.

4. The filtrate from step 3 was cooled to 26° C. and the solids which formed were recovered by filtration. The recovered solids constructed a hard non-tacky wax and amounted to 9.1% of the crude settlings used in step 1.

Example 5

A portion of tank settlings S–1 was subjected to the following treatments:

1. One part of the settlings was boiled with 3 parts of isopropyl alcohol and the insoluble materials were removed by settling and decanting the hot mixture.

2. The filtrate from step 1 was cooled to 26° C., maintained at that temperature for one hour, and the solids which formed were recovered by filtration.

3. One part of the solids recovered in step 2 was boiled with 3 parts isopropyl alcohol and the insoluble materials were removed by settling and decanting the hot mixture.

4. The supernatant liquid from step 3 was cooled to 26° C., maintained at that temperature for one hour, and the solids which formed were recovered by filtration.

5. One part of the solids recovered in step 4 was boiled with 3 parts of isopropyl alcohol and the insoluble materials were removed by settling and decanting the hot mixture.

6. The supernatant liquid from step 5 was cooled to 26° C., maintained at that temperature for one hour, and the solids which formed were recovered by filtration. The recovered solids constituted a hard non-tacky wax and amounted to 11.6% of the crude settlings used in step 1.

Example 6

One part of tank settlings S–2 was subjected to the treatments described in Example 5. The solids recovered in step 6 constituted a hard non-tacky wax amounting to 3.4% by weight of the crude settlings used in step 1.

A comparison of the physical and chemical properties of the waxes produced by the above examples (designated as samples I to VI) with carnauba wax is given in Table II.

Example 7

One part of wax, sample II, was added to 4 parts of water and 0.5 part of 29% hydrogen peroxide, and the mixture was stirred for 2.5 hours at about 95° C. After the bleached wax was washed with water and dried, it had a Gardner color (Tsuchiya, Tomotaro, J. Nippon Oil Technol. Soc.; 1, No. 1, 1–6 (1948) of 18 in the liquid state and a bright tan color in the solid state. When the bleaching procedure was modified by the addition of 4.5 parts of 40% sulfuric acid to the bleaching mixture and an increase in the bleaching time to 3.5 hours, there was no improvement in the color of the bleached wax.

Example 8

One part of wax, sample III, was mixed with 4.5 parts of 40% sulfuric acid. While the mixture was at a temperature of 95° C., 0.5 part of chomium trioxide was added slowly and with constant stirring. Heating and stirring were continued for a period of 2.5 hours, and then the sample was washed successively with 40% sulfuric acid and distilled water. The Gardner color of the bleached, melted sample was 4. The use in the bleaching process of 1 part of chromium trioxide in the place of 0.5 part produced a color of 1.

When a combination of hydrogen peroxide and chromium trioxide (generally 0.5 part of 29% hydrogen peroxide and 1 part of chromium trioxide per 1 part of wax) was used, the bleaching action usually produced a white wax. In such a bleaching the hydrogen peroxide and 40% sulfuric acid were added first and mixed for about 1 hour at 95° C. before the chromium trioxide was added slowly. The spent bleaching reagents were removed as usual by washing the wax successively with a solution of sulfuric acid and water.

Bleaching with chromium trioxide lowered slightly the melting point of a wax, but at the same time it increased the hardness and lowered the iodine value.

TABLE II
*Chemical and physical analysis of refined rice bran wax and carnauba wax*

| Sample | Yield ᵃ, Percent | Free fatty acids, percent | Iodine value | Unsaponifiable, percent | Saponification value | Phosphorus, percent | Volatile matter, percent | Melting point, drop method, ° C. | Softening point, ° C. | Hardness | Color | Tack |
|---|---|---|---|---|---|---|---|---|---|---|---|---|
| I | 13.7 | 2.7 | 13.0 | 57.5 | 104.4 | 0.01 | 0.66 | 75.8 | 75.3 | 100 | Black | None. |
| II | 12.8 | 7.3 | 13.6 | 67.0 | 56.9 | 0.01 | 2.94 | 78.7 | 76.7 | 100 | Dark Brown | Do. |
| III | 8.3 | 5.5 | 17.7 | 56.0 | 79.9 | 0.15 | 0.62 | 78.9 | 77.0 | 100 | Brown | Do. |
| IV | 9.1 | 2.7 | 11.1 | 56.0 | 77.9 | 0.08 | 0.41 | 79.9 | 79.0 | 100 | ----do---- | Do. |
| V | 11.6 | 2.1 | 16.3 | 57.2 | 84.6 | 0.11 | 0.38 | 78.7 | 76.7 | 100 | ----do---- | Do. |
| VI | 3.4 | 2.7 | 19.4 | 55.1 | 80.4 | 0.18 | 0.61 | 75.3 | 74.3 | 100 | Black | Do. |
| Carnauba | | 2.9 | 9.4 | 56.9 | 77.0 | 0.00 | 0.25 | 83.4 | 82.5 | 100 | Tan | Do. |

ᵃ Based on original weight of screened tank settlings.

We claim:

1. A process of recovering a hard wax from crude rice bran oil tank settlings containing wax components, acetone-soluble components, and components which are hydrolyzable to water-soluble materials and which are selected from the group consisting of substances which are hydrolyzable with water and substances which are saponifiable with an alkali metal hydroxide, comprising washing the crude rice bran oil tank settlings with acetone to dissolve the acetone-soluble components thereof, reacting the acetone-washed settlings with a member of the group consisting of water and an alkali metal hydroxide to convert the respective hydrolyzable components to water-soluble materials, washing the resulting hydrolyzed settlings with water to remove the water-soluble materials, mixing the water-washed settlings with about 3 times their weight of isopropanol at a temperature of from about 70 to 80° C., isolating the resulting isopropanol solution, cooling it to about 26° C., and isolating the resulting solids, which solids consist essentially of rice bran oil components which are soluble in about 3 times their weight of isopropanol at about 70 to 80° C. but are insoluble in about 3 times their weight of isopropanol at about 26° C., mixing said solids with about 6 times their weight of isopropanol at a temperature from about 70 to 80° C., isolating the resulting isopropanol solution, cooling it to about 26° C., and isolating the resulting solids, which solids consist essentially of rice bran oil wax components which are soluble in about 3 times their weight of isopropanol at about 70 to 80° C. but which are insoluble in about 6 times their weight of isopropanol at about 26° C., and which solids comprise a hard rice bran wax.

2. A process of recovering a hard wax from crude rice bran oil tank settlings containing wax components, acetone-soluble components, and components which are hydrolyzable with water to water-soluble materials, comprising washing the crude rice bran oil tank settlings with acetone to dissolve the acetone-soluble components thereof, reacting the acetone-washed settlings with water at a temperature above the boiling point of water to convert the hydrolyzable components to water-soluble materials, washing the resulting hydrolyzed settlings with water to remove the water-soluble materials, mixing the water-washed settlings with about 3 times their weight of isopropanol at a temperature of from about 70 to 80° C., isolating the resulting isopropanol solution, cooling it to about 26° C., and isolating the resulting solids, which solids consist essentially of rice bran oil components which are soluble in about 3 times their weight of isopropanol at about 70 to 80° C. but are insoluble in about 3 times their weight of isopropanol at about 26° C., mixing said solids with about 6 times their weight of isopropanol at a temperature from about 70 to 80° C., isolating the resulting isopropanol solution, cooling it to about 26° C., and isolating the resulting solids, which solids consist essentially of rice bran oil wax components which are soluble in about 3 times their weight of isopropanol at about 70 to 80° C. but which are insoluble in about 6 times their weight of isopropanol at about 26° C., and which solids comprise a hard rice bran wax.

3. A process of recovering a hard wax from crude rice bran oil tank settlings containing wax components, acetone-soluble components, and components which are saponifiable with alkali to water soluble materials, comprising washing the crude rice bran oil tank settlings with acetone to dissolve the acetone-soluble components thereof, reacting the acetone-washed settlings with an aqueous alkali metal hydroxide to saponify the saponifiable components to water-soluble materials, neutralizing the saponified settlings, washing the resulting neutralized settlings with water to remove the water-soluble materials, mixing the water-washed settlings with about 3 times their weight of isopropanol at a temperature of from about 70 to 80° C., isolating the resulting isopropanol solution, cooling it to about 26° C., and isolating the resulting solids, which solids consist essentially of rice bran oil components which are soluble in about 3 times their weight of isopropanol at about 70 to 80° C. but are insoluble in about 3 times their weight of isopropanol at about 26° C., mixing said solids with about 6 times their weight of isopropanol at a temperature from about 70 to 80° C., isolating the resulting isopropanol solution, cooling it to about 26° C., and isolating the resulting solids, which solids consist essentially of rice bran oil wax components which are soluble in about 3 times their weight of isopropanol at about 70 to 80° C. but which are insoluble in about 6 times their weight of isopropanol at about 26° C., and which solids comprise a hard rice bran wax.

(References on following page)

References Cited in the file of this patent

UNITED STATES PATENTS

| | | |
|---|---|---|
| 2,456,661 | Wilder | Dec. 21, 1948 |
| 2,662,907 | Henn et al. | Dec. 15, 1953 |

OTHER REFERENCES

Reddi et al.: Oil Obtained by Solvent Extraction, J. of American Oil Chemists Society, June 1948, pages 206–211.

Cousins et al.: Rice Bran Oil, J. of American Oil Chemists Society, January 1953, pages 9–14.